(12) United States Patent
Kronqvist et al.

(10) Patent No.: US 11,575,608 B2
(45) Date of Patent: Feb. 7, 2023

(54) MANAGING DATA FLOW BETWEEN SOURCE NODE AND RECIPIENT NODE

(71) Applicant: NSION Oy, Tampere (FI)

(72) Inventors: Mattipekka Kronqvist, Tampere (FI); Juho Blankenstein, Tampere (FI); Markus Eronen, Tampere (FI)

(73) Assignee: NSION Oy, Tampere (FI)

( * ) Notice: Subject to any disclaimer, the term of this patent is extended or adjusted under 35 U.S.C. 154(b) by 0 days.

(21) Appl. No.: 17/181,508

(22) Filed: Feb. 22, 2021

(65) Prior Publication Data

US 2022/0200909 A1 Jun. 23, 2022

(30) Foreign Application Priority Data

Dec. 23, 2020 (FI) ..................................... 20206368

(51) Int. Cl.
| | |
|---|---|
| *H04L 47/193* | (2022.01) |
| *H04L 43/0817* | (2022.01) |
| *H04L 43/0882* | (2022.01) |
| *H04L 43/16* | (2022.01) |
| *H04L 47/24* | (2022.01) |
| *H04L 47/30* | (2022.01) |

(52) U.S. Cl.
CPC ........ *H04L 47/193* (2013.01); *H04L 43/0817* (2013.01); *H04L 43/0882* (2013.01); *H04L 43/16* (2013.01); *H04L 47/24* (2013.01); *H04L 47/30* (2013.01)

(58) Field of Classification Search
None
See application file for complete search history.

(56) References Cited

U.S. PATENT DOCUMENTS

| | | | |
|---|---|---|---|
| 2009/0024809 A1 | 1/2009 | Panther et al. | |
| 2010/0061238 A1* | 3/2010 | Godbole | ............... H04L 47/263 370/235 |
| 2011/0013514 A1 | 1/2011 | Mahkonen | |

(Continued)

FOREIGN PATENT DOCUMENTS

| | | |
|---|---|---|
| WO | 1999/000984 | 1/1999 |
| WO | 2010060106 A1 | 5/2010 |
| WO | 2018027237 A1 | 2/2018 |

OTHER PUBLICATIONS

Office Action issued in corresponding Finnish Patent Application No. 20206368 dated May 14, 2021.

(Continued)

*Primary Examiner* — Anh Nguyen
(74) *Attorney, Agent, or Firm* — Meunier Carlin & Curfman LLC

(57) ABSTRACT

There is provided managing a data flow between a source node and a recipient node. A method comprises storing, at the source node, data frames into a buffer for transmission to the recipient node over a host-to-host protocol connection; measuring, at the source node, a connection quality of the host-to-host protocol connection; adjusting, at the source node, one or more target parameters of the transmission on the basis of the measured connection quality; transmitting, by the source node, data frames from the buffer to the recipient node on the basis of a Last-In, First-Out (LIFO) method and the adjusted one or more target parameters.

11 Claims, 9 Drawing Sheets

(56) References Cited

U.S. PATENT DOCUMENTS

| | | | |
|---|---|---|---|
| 2015/0347340 A1* | 12/2015 | Dixon | G06F 13/362 |
| | | | 710/124 |
| 2017/0230861 A9 | 8/2017 | Terry et al. | |
| 2019/0158371 A1* | 5/2019 | Dillon | H04L 43/087 |
| 2019/0327463 A1* | 10/2019 | Zhao | H04N 19/103 |
| 2020/0107069 A1 | 4/2020 | Sudak et al. | |

OTHER PUBLICATIONS

Hu, N., et al., "Improving TCP Startup Performance using Active Measurements: Algorithm and Evaluation," Proceedings of the 11$^{th}$ IEEE International Conference on Network Protocols (ICNP'03), 2003, pp. 107-118.

Liu, Y., et al., "TCP-CM: A Transport Protocol for TCP-friendly Transmission of Continuous Media," Proceedings of the 2002 IEEE International Conference on Performance, Computing and Communications (IPCCC), 2002, pp. 83-91.

Extended European Search Report, dated May 13, 2022, received in connection with corresponding EP Patent Application No. 21216281.2.

* cited by examiner 202 storing, at the source node, data frames into a buffer for transmission to the recipient node over a host-to-host protocol connection 204 measuring, at the source node, a connection quality of the host-to-host protocol connection 206 adjusting, at the source node, one or more target parameters of the transmission on the basis of the measured connection quality 208 transmitting, by the source node, data frames from the buffer to the recipient node on the basis of a Last-In, First-Out (LIFO) method and the adjusted one or more target parameters

Fig. 2

| 902 determining at least one of an end of data flow and an increased bandwidth to the recipient node |
|---|

↓

| 904 purging the transmission buffer to the recipient node |
|---|

| Viewer node | Frame rate | Compression parameter | Quality (resolution) | Compression format |
|---|---|---|---|---|
| Audio player Software | 20ms – 1000ms | Compression efficiency parameter | 8kHz – 48kHz | Opus, MP3, AAC |
| Video player Software | 1 – 30 fps | Compression efficiency parameter | 320p – 4k | Webp, Jpeg, H264, H265 |
| Analytics Software | Scalable frame rate requirements | static | static | any |

Fig. 11

MANAGING DATA FLOW BETWEEN SOURCE NODE AND RECIPIENT NODE

CROSS-REFERENCE TO RELATED APPLICATIONS

This application claims priority to, and the benefit of, Finnish Patent Application No. 20206368, filed Dec. 23, 2020, which is incorporated by reference herein in its entirety.

TECHNICAL FIELD

The present invention relates to managing a data flow between a source node and a recipient node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

WO2018027237A1 discloses that multiple broadcasters create live streams of digital content relating to live events, and multiple viewers of each broadcaster receive copies of the live streams. Viewer latency is significantly reduced, and event information relating to live events is synchronized amongst all broadcasters and viewers of live streams relating to the same event. Scalable and flexible access to live streams is provided to different types and numbers of viewers with different qualities of service. A social media platform is provided in tandem with live streaming of digital content relating to live events, to allow a given broadcaster and their associated viewers to communicate with one another, comment on the event and/or the broadcasters live stream, and send digital gifts. In one example, the broadcasters' digital content includes video-based commentary regarding live sporting events, and studio-quality graphics and animations (including animated synchronized scorebugs) are provided on mobile client devices in tandem with the broadcasters' video-based commentary and social networking functionality.

Real-time communications of data from a source to a recipient enables the recipient to have the most recent data generated at the source. Quality of the real-time data may be insufficient if the data rate supported between the source and the recipient is too low for high-quality data. The source and the recipient may connect over more than one data link that may be over wired or wireless connections, whereby variance of the data rate supported between the source and the recipient maybe relatively high.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which:

FIG. 2 illustrates a method in accordance with at least some embodiments;

FIG. 11 illustrates examples of target parameters for viewer nodes.

DETAILED DESCRIPTON OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
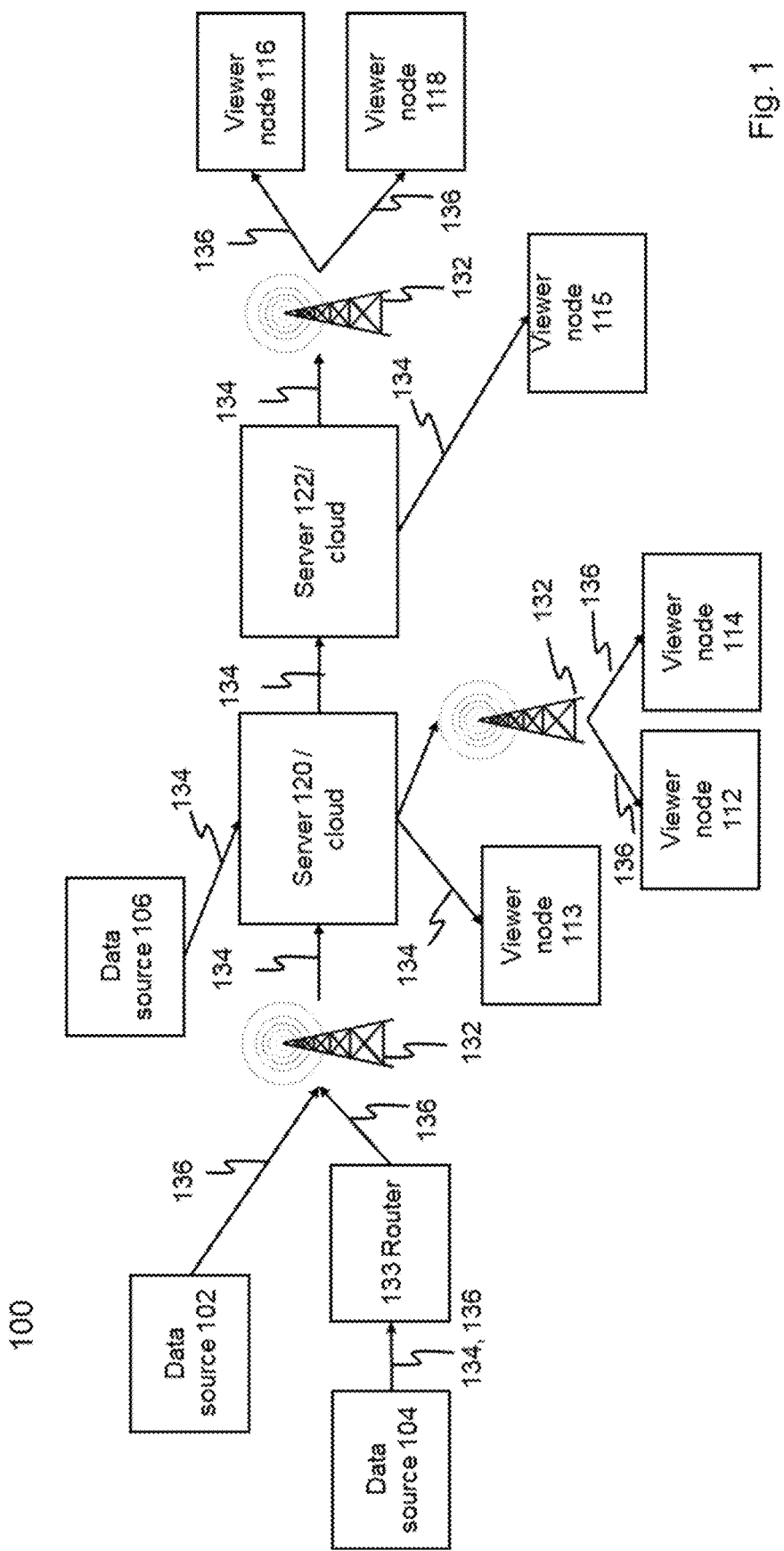
FIG. 1 illustrates a communications system for communications of data flow in accordance with at least some embodiments.

FIG. 1 illustrates a communications system 100 for communications of data flow in accordance with at least some embodiments. The communications system may comprise one or more data sources 102, 104, 106 and one or more viewer nodes 112, 113, 114, 115 116, 118. The data sources and viewer nodes may be connected to one or more servers 120, 122. The servers may be implemented as cloud servers and referred to clouds. Connections between the data sources and the servers, and connections between the servers and the viewer nodes may comprise one or more routers 133, wired data links 134, wireless data links 136, radio access networks 132, local area networks, sub-networks and/or wide area networks. accordingly, the connections may be heterogenous, whereby connections between each data source and viewer node may have different capabilities, for example in terms of the physical communications medium being a wireless medium or a wireless medium, in terms of supported data rates, delay performance and delay variance. The servers may be connected to the internet, whereby the data sources transmit data frames to the servers provided the data sources have Internet connectivity and the viewer nodes may be delivered data frames from the servers provided viewer nodes have internet connectivity. Examples of the wired data links 134 comprise at least Ethernet cables and fiber optic cables. Examples of the wireless data links 136 comprise at least wireless access links and wireless backhaul links of cellular radio access networks, relay links and wireless bridges. A cellular radio access network may be according to a cellular communications technology such as 3G, 4G or 5G defined by the 3GPP. Examples of the viewer nodes comprise user devices that comprise a user interface via which a user may consume content rendered on the basis of the communicated data flow. A user device may be user equipment of a mobile communications system, such as a mobile phone. On the other hand a user device may be a computer workstation. It should be noted that the data sources may serve at least for source nodes in accordance with at least some embodiments described herein. It should be noted that the viewer nodes may serve at least for recipient nodes in accordance with at least some embodiments described herein. It should be noted that the servers may serve for source nodes and/or recipient nodes in accordance with at least some embodiments described herein. Connections between the source nodes and recipient nodes may comprise host-to-host protocol connections.

A host-to-host protocol provides communications of data frames over a connection between communicating endpoints, in this case a source node and a recipient node that host protocol entities of the host-to-host protocol. At the source node, data frames may be generated to be transmitted to the recipient node. At the recipient node, data frames received from the source node may be consumed. In an example, at the recipient node the data frames may be processed by an analytics software application for machine-based processing the data frames from the source node and/or a software application for consuming the data frames by a user. In an example, the data frames may be processed by the software application that causes, playing the data frames in audio, video or displaying the data frames in still images, graphics and/or textual formal to the user. Examples of the host-to-host protocol connections comprise at least Transmission Control Protocol (TCP) connections, User Datagram Protocol (UDP) connections, transport layer protocol connections and connections on protocol layers above the transport protocol layer. Connections on protocol layers above the transport protocol layer comprise at least application layer protocol connections. Accordingly, both the source node and the recipient node may host a protocol stack that comprises a host-to-host protocol, for example a transport layer protocol, e.g. the TCP or UDP, or a protocol above the transport layer, for communications of data frames between the source node and the recipient node.

Data flow may refer to real-time data that is generated at a source node. The real-time data may be generated by a Data Frame Generator (DFG). The DFG may be configured to generate data frames comprising still images, video and/or other computer-readable data such as positioning data. A data frame may comprise a header and a payload that carries the content, i.e. the still images, video and/or other computer-readable data such as positioning data. The header may comprise information for identifying the content, for example information identifying a compression format of the content and a source node of the content, a quality of the content and a size of the content. The header enables at least consuming the content at a recipient node. In an example, the quality and size of the content may be defined by a resolution. The resolution may be e.g. a resolution of still images or video. However, it should be noted that computer-readable data representing other content, such as positioning data, may be encoded into data frames by a Data Frame Generator (DFG). Examples of the DFG comprise at least a still camera, a video camera and a positioning device, a camera application and a positioning application. The positioning device and positioning application may be configured to generate positioning data, for example Global Positioning System (GPS) data.

An example of generating real-time data comprises at least generating data frames on the basis of data from a data source. Examples of data sources comprise at least a digital camera, a video camera and a positioning system (POS). A DFG may comprise a data source or be connected to one or more of the data sources for generating real-time data. Accordingly, the data from a data source may comprise at least data captured by a digital camera, a video camera and/or a positioning system.

Real-time data may be captured at a source node for transmission by the source node to a recipient node. The real-time data may be stored to a transmission buffer hosted by the source node, where the real-time data may be retrieved for transmission to the recipient node. The real-time data may be transmitted from the source node to the recipient node without storing the real-time data for offline processing at source node. Real-time data stored to the transmission buffer may be managed on the basis of Last-in, First-Out (LIFO) method, where a unit or frame of real-time data stored to the buffer last is the first unit or frame of real-time data retrieved for transmission to the recipient node. In practice, real-time data may be stored to the transmission buffer at a free position (POS) of the buffer whereby a memory pointer to the free position may be updated to the next free position (POS+1). When a transmission is scheduled from the source node to the recipient node, the real-time data to be transmitted to the recipient node is retrieved from the buffer at (POS−1) that points to the real-time data that has been stored to the transmission buffer the last. In this way the recipient node may be provided real-time data, whenever the transmission is scheduled to from the source node to the recipient node. It should be noted that if a frame rate from the source node to the recipient node is slow, e.g. less than a target frame rate at which data frames are generated and stored to the transmission buffer, data frames are accumulated to the transmission buffer over time. It should be noted that if frame rate from the source node to the recipient node is high, e.g. higher than a target frame rate at which data frames are generated and stored to the transmission buffer, the transmission buffer is drained over time.

Viewer nodes may be host-to-host protocol endpoints at a server and/or at user devices. The viewer nodes are recipient nodes of data frames from source nodes. Examples of the viewer nodes at the server comprise at least analytics software applications for machine-based processing the data frames from the source node. Examples of the viewer nodes at the user devices comprise software applications, e.g. audio players, video players, that are operatively connected to one or more user interface devices configured at least for audio and/or video output to user. The software applications may be configured to cause rendering/playing content included to the data frames on the user devices such that the user may consume the content.

Up-to-date situational awareness is used herein to refer to a recipient node being provided data frames of a data flow from one or more source nodes which enable the recipient node to have at each time instant the latest data frame generated by the source nodes. In various embodiments described herein the situational awareness is provided by real-time communications of data frames with sufficient quality between the source nodes and the recipient node. In this way the recipient node and a user of the recipient node may have the latest data frame from each of the source nodes within a controlled delay after the data frames have been generated at each of the source nodes.

FIG. 2 illustrates a method in accordance with at least some embodiments. The method provides managing a data flow between a source node and a recipient node. The method may be performed by the source node. The method supports up-to-date situational awareness by real-time communications of data frames with sufficient quality between the source node and the recipient node.

Phase 202 comprises storing, at the source node, data frames into a buffer for transmission to the recipient node over a host-to-host protocol connection.

Phase 204 comprises measuring, at the source node, a connection quality of the host-to-host protocol connection.

Phase 206 comprises adjusting, at the source node, one or more target parameters of the transmission on the basis of the measured connection quality. Examples of the target parameters comprise at least a target frame rate, quality and compression format for the data frames.

Phase 208 comprises transmitting, by the source node, data frames from the buffer to the recipient node on the basis of a Last-In, First-Out (LIFO) method and the adjusted one or more target parameters. The latest data frame is transmitted to the recipient, even if frame rate was reduced at phase 206 from a target frame rate, since the data frames are transmitted based on LIFO. Since the data frames are transmitted using the LIFO method, the newest data frame in the buffer is always transmitted to the recipient node. The adjusted target parameters provide that the data frames may be generated at a rate and quality that enables successful reception of the data frames at the recipient node. In this way real-time communications may be supported.

In an example, phase 202 comprises, generating at the source node, the data frames on the basis of one or more target parameters. Examples of the target parameters comprise at least a target frame rate, size, quality and compression format of the data frames. The target parameters provide that generated data frames may be transmitted in real-time to the recipient node in accordance with phase 208. The target parameters may have default values or the target parameters may be determined by the recipient node and used at the source node to set/adjust the parameters used at the source node.

In an example, at phase 202, the data frames may be generated at a target frame rate that allows a generated data frame to be stored to the transmission buffer and transmitted, in accordance with phase 208, before a next data frame according to the frame rate is stored to the transmission buffer. In this way size of the transmission buffer may be kept small. In this example a target size and/or quality of the generated frames may be limited to enable transmitting each data frame before the next is generated using the available bandwidth between the source node and the recipient node.

In an example, at phase 202, the data frames may be generated at a target frame rate that allows storing a selected number of generated data frames to the transmission buffer before transmitting a data frame from the transmission buffer, in accordance with phase 208. In this way size of the transmission buffer may be designed based on the selected number of generated data frames and a selected duration for the data flow. In this example a target size and/or quality of the generated frames may be higher than in the above example since a part of the generated data frames may be stored to the transmission buffer which leaves more time for transmitting the generated data, in accordance with phase 208, at least when the available bandwidth is maintained.

In an example, phase 204 comprises determining the connection quality on the basis of a success rate of real-time delivery of data frames from the source node to the recipient node. The success rate may be determined on the basis of success and/or unsuccessful transmissions of data frames over the host-to-host protocol connection in a time interval. The time interval may be determined sufficiently small such that failed transmissions of the data frames may be remedied by adjusting one or more of the target parameters in accordance with phase 206 and transmitting one or more further data frames using the adjusted one or more of the target parameters in accordance with phase 208, whereby real-time delivery of data frames may be supported over the host-to-host protocol connection. In an example the success rate may be determined at the source node on the basis of feedback information determined for each data frame transmitted over the host-to-host protocol connection. The feedback information may be received from the recipient node in accordance with the host-to-host protocol. In an example the success rate may be determined on the basis of a number of frames in a time interval for which a negative feedback information has been received and/or no feedback information has been received. The success rate may be a percentage value between 0% to 100% or a category a set of success rate categories. In an example, the set of success rate categories comprises a full success rate, a partial success rate and a poor success rate. Following the example of success rate categories, the success rate may be a full success rate, if the number of frames in a time interval for which a negative feedback information has been received and/or no feedback information has been received, is zero. On the other hand, the success rate may be a partial success rate, if the number of frames in a time interval for which a negative feedback information has been received and/or no feedback information has been received, is above zero. On the other hand, the success rate may be a poor success rate, if the number of frames in a time interval for which a negative feedback information has been received and/or no feedback information has been received, is the number of frames transmitted in the time interval, i.e. this indicates that all transmissions have been failed. Accordingly, the success rate may be implemented effectively as a counter that may be evaluated once in the time interval that is set for the success rate.

In an example, the success rate may be evaluated against a threshold for determining a connection quality in phase 204. An example of the threshold is a number of consecutive data frames for which a negative feedback information has been received and/or no feedback information has been received in a time interval. In another example the threshold may be a portion of frames in a time interval or a percentage value of data frame in a time interval for which no negative feedback information has been received and/or feedback information has been received.

In an example, the connection quality in phase 204 may be measured on the basis of feedback information determined for each data frame transmitted over the host-to-host protocol connection. The feedback information may indicate a failure or a success of a transmission of a data frame. If feedback information for a given data frame is not received the feedback information for that data frame may be determined to indicate a failure. In this way a success rate may be determined. For example, the success rate may be a ratio of frames for which feedback information has been received to a total number of frames. It should be noted that the connection quality may be determined on the basis of a selected feedback information. Accordingly, the feedback information for determining the connection quality may at least comprise the feedback information received for frames that have been transmitted after adjusting the one or more parameters the last time.

In an example one or more functionalities of the method described with FIG. 2 may be performed by an apparatus, e.g. a user device, that comprises a single buffer. In such case the apparatus may serve as generator of data frames and delivery of the data frames to a plurality of viewer nodes may be achieved by the apparatus transmitting data frames to a server in accordance with phase 208.

In an example one or more functionalities of the method described with FIG. 2 may be performed by an apparatus, e.g. a server, that manages delivery of data frames from data sources, for example user devices, to viewer nodes. In such case the apparatus may host buffers, i.e. transmission buffers, for transmitting data frames to each of the viewer nodes and data flows to each of the viewer nodes may be managed in accordance to described with phases 202 to 208. In this way real-time data delivery to each of the viewer nodes may be supported based on their individual connection qualities.

Figure 3:
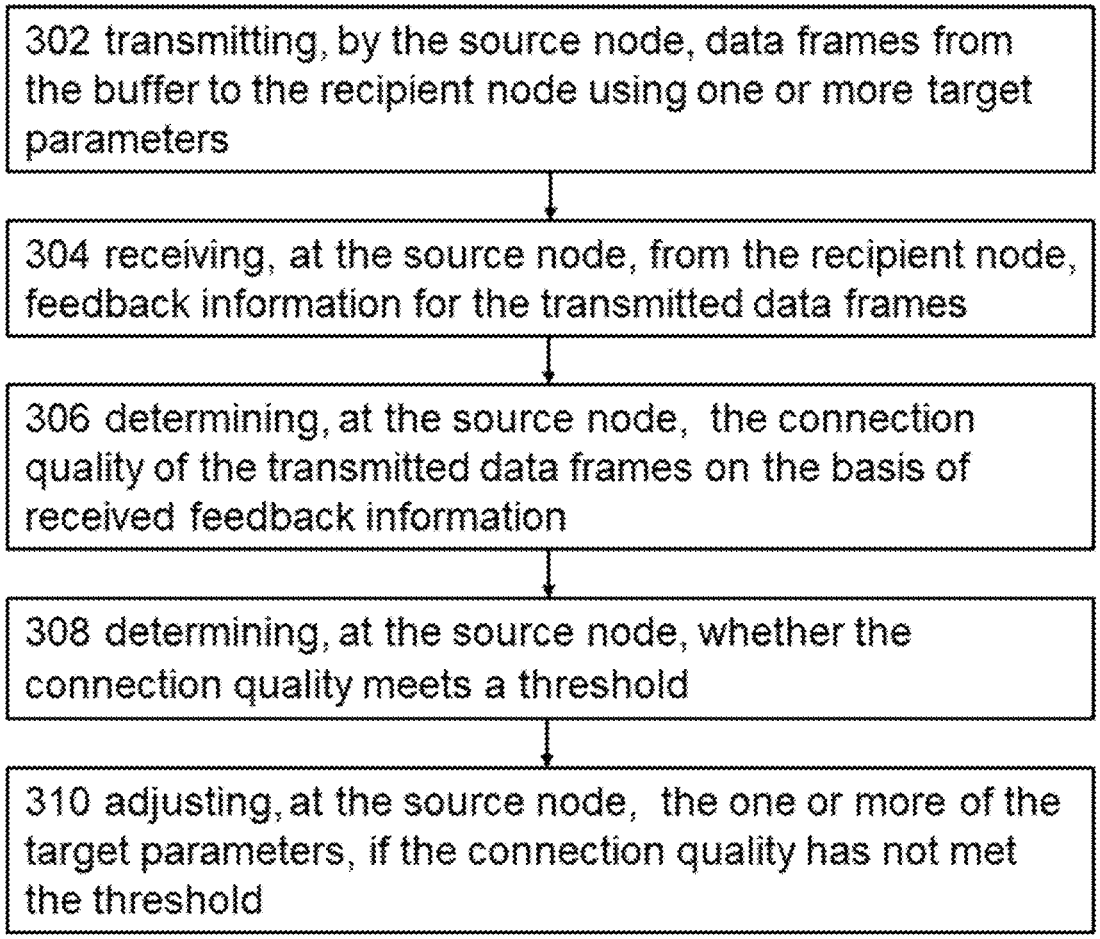
FIG. 3 illustrates a method in accordance with at least some embodiments.

FIG. 3 illustrates a method in accordance with at least some embodiments. The method provides managing a data flow between a source node and a recipient node. The method may be performed by the source node for example in connection with one or more phase of the method described with FIG. 2.

Phase 302 comprises transmitting, by the source node, data frames from the buffer to the recipient node using one or more target parameters.

Phase 304 comprises receiving, at the source node, from the recipient node, feedback information for the transmitted data frames.

Phase 306 comprises determining, at the source node, the connection quality of the transmitted data frames on the basis of received feedback information.

Phase 308 comprises determining, at the source node, whether the connection quality meets a threshold.

Phase 310 comprises adjusting, at the source node, the one or more of the target parameters, if the connection quality has not met the threshold.

In this way successful delivery of the data frames at the recipient node may be facilitated, whereby a data frame generated at the source node can be consumed in real-time at the recipient node. The adjusted target parameters provide that the data frames may be generated at a rate and quality that enables successful reception of the data frames at the recipient node. In this way real-time communications may be supported.

In an example, the one or more target parameters at phase 302 comprise a target frame rate that may have been set by the recipient node. The recipient node may e.g. transmit a request to the source node to transmit using the target frame rate.

In an example phase 308 comprises that the threshold is for a success rate of real-time delivery of data frames from the source node to the recipient node. Then in phase 310, if the success rate is not sufficiently high, the frame rate may be adjusted.

In an example phase 310 comprises that a target frame rate is decreased. In this way a number of data frames stored to the buffer may be increased since a fewer data frames are transmitted based on the LIFO method and the decreased frame rate.

Figure 4:
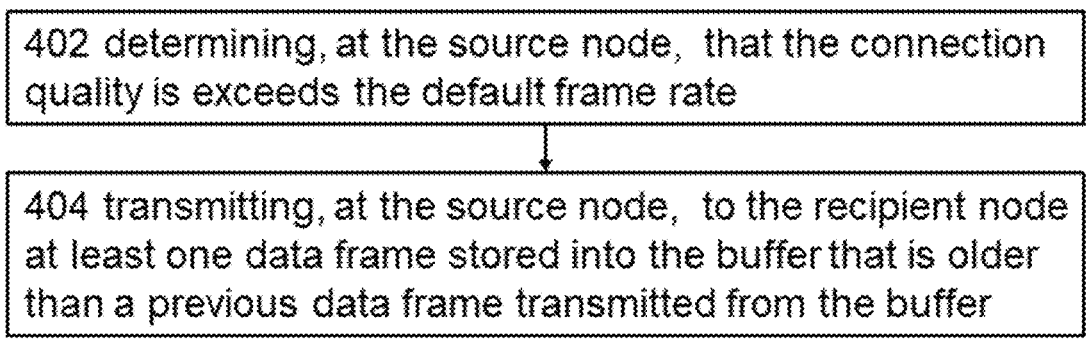
FIG. 4 illustrates a method in accordance with at least some embodiments.

FIG. 4 illustrates a method in accordance with at least some embodiments. The method provides managing a data flow between a source node and a recipient node. The method may be performed by the source node. The method may be performed in connection with at least one of the phases described with FIG. 2 and FIG. 3.

Phase 402 comprises determining, at the source node that the connection quality exceeds the one or more of the target parameters.

Phase 404 comprises transmitting, at the source node, to the recipient node at least one data frame stored into the buffer that is older than a previous data frame transmitted from the buffer.

In an example phase 402 comprises determining that a capability of the connection has increased.

In an example phase 402 comprises determining that a quality of the connection has increased. The connection quality may be higher than a threshold. For example, a success rate may be higher than a threshold.

In an example phase 404 comprises that the buffer is emptied from data frames and the data frames are transmitted to the recipient node. In this way the recipient node may reconstruct the data flow to include all the data frames buffered for transmission at the source node.

Figure 5:
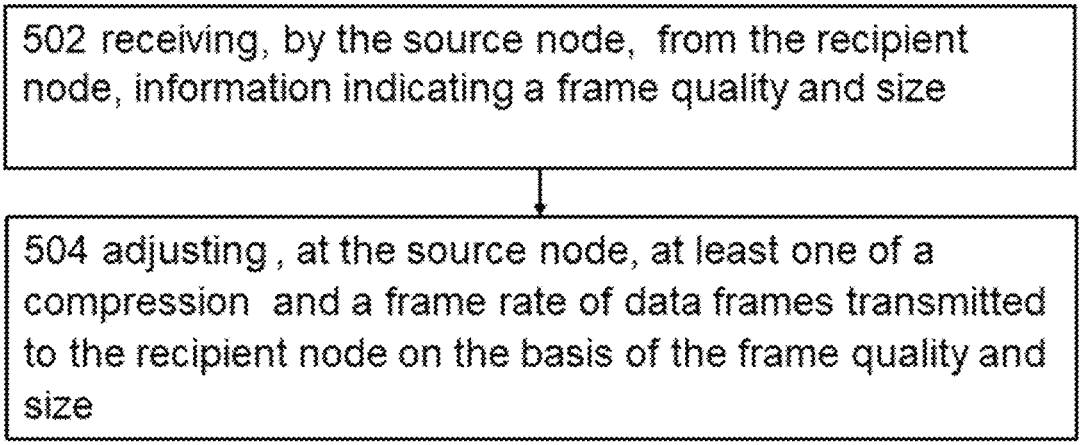
FIG. 5 illustrates a method in accordance with at least some embodiments.

FIG. 5 illustrates a method in accordance with at least some embodiments. The method provides managing a data flow between a source node and a recipient node. The method may be performed by the source node. The method may be performed in connection with at least one of the phases described with FIG. 2 and FIG. 3.

Phase 502 comprises receiving, by the source node, from the recipient node, information indicating a frame quality and size. In an example, the quality and size may be indicated by a resolution.

Phase 504 comprises adjusting , at the source node, at least one of a compression format and a frame rate of data frames transmitted to the recipient node on the basis of the frame quality and size.

In an example, at phase 502, the frame quality and size may be target parameters determined by the recipient node. Then, at phase 504, the source node may adjust a compression format and a frame rate that are target parameters for data frames transmitted from the source node to the recipient node. The adjusted target parameters provide that the data frames may be generated at a rate and quality that enables successful reception of the data frames at the recipient node. In this way real-time communications may be supported.

Figure 6:
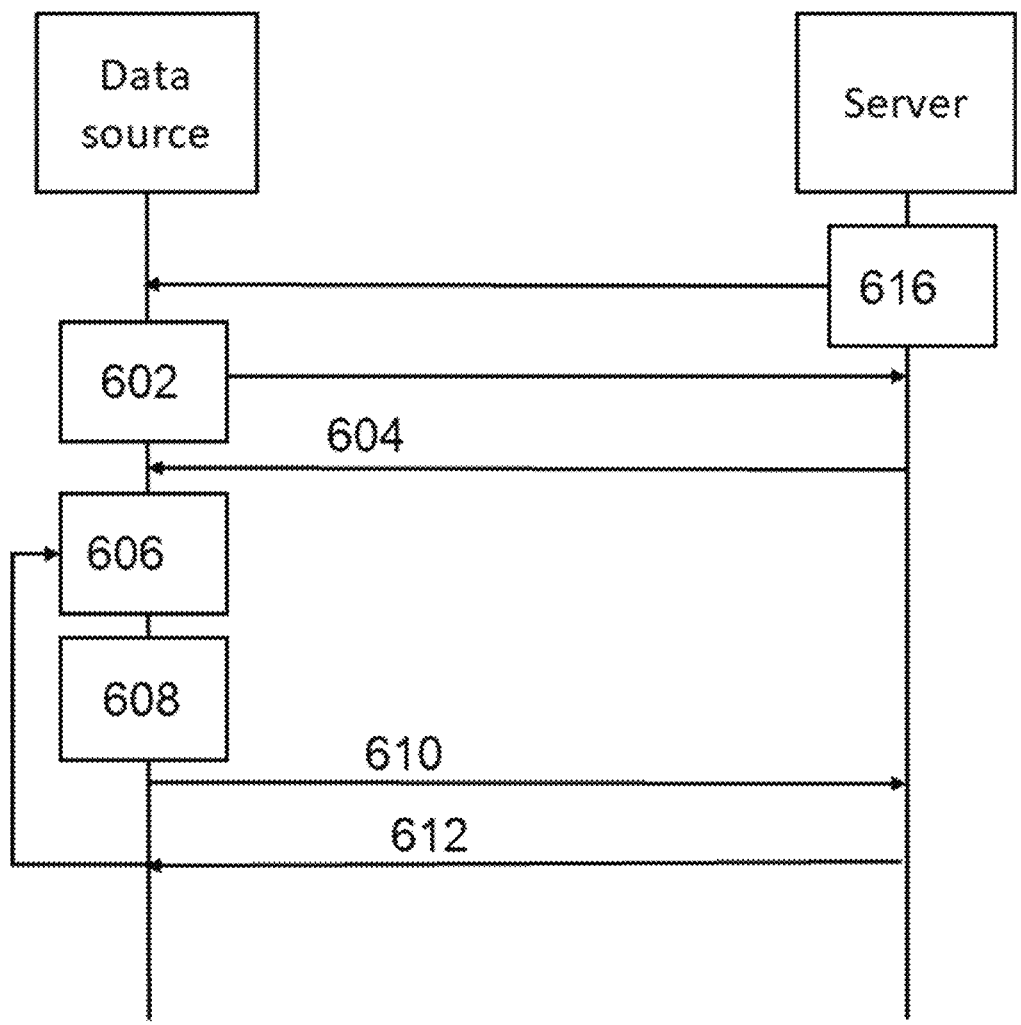
FIG. 6 illustrates a sequence for managing a data flow from a data source to a server in accordance with at least some embodiments.

FIG. 6 illustrates a sequence for managing a data flow from a data source to a server in accordance with at least some embodiments.

Phase 602 comprises the source node transmitting one or more data frames to the server over a host-to-host protocol connection using one or more target parameters. It should be noted that in this connection the server is a recipient node of the host-to-host protocol connection. Examples of the target parameters comprise at least a target frame rate, size, quality and compression format of the data frames.

In an example, the target frame rate, the target size, quality and/or compression format cause generating at the source node data frames that have the target size, quality and/or compression format. The generated frames are stored to the LIFO buffer for transmission to a recipient node. The target size may be the size of the data frame of the host-to-host protocol, e.g. TOP frame or UDP frame. The target quality may be a quality, e.g. resolution, of the payload of the data frames of the host-to-host protocol, e.g. TCP frames or UDP frames. The target compression format may be a lossless compression format or a lossy compression format that has been applied to the payload of the data frames of the host-to-host protocol, e.g. TCP frames or UDP frames, Phase 604 comprises the server executing the host-to-host protocol between the data source and the server and transmitting an acknowledgement (ACK) in response to the data frames received from the data source. The ACK may be sent in response to each data frame received from the data source. In this way the data source may receive feedback information for the transmitted data frames from the server.

Phase 606 comprises determining, at the data source, a connection quality of the transmitted data frames on the basis of received feedback information. In an example the connection quality may be a success rate of real-time delivery of data frames to the server.

Phase 608 comprises adjusting, at the data source, one or more of the target parameters, if the connection quality has not met a threshold. The threshold may be determined on the basis of one or more of the target parameters or adjusted target parameters. If the threshold has not been met, the adjusting may be omitted.

Phase 610 comprises transmitting, by the data source, data frames to the recipient node on the basis of the one or more target parameters. It should be noted that the one or more of the target parameters may have been adjusted at phase 608.

Phase 612 comprises the data source receiving feedback information for the transmitted data frames from the server. Then, the connection quality may be determined anew at phase 606.

Phase 616 comprises the server determining the one or more target parameters and transmitting information indicating the determined one or more target parameters to the source node. In this way the server may cause adjusting, at the source node, at phase 602, the target parameters for the data frames and cause the data flow from the source node to be in accordance with the adjusted target parameters. The phase 616 may be performed before transmission of the data frames at phase 602, whereby adjusting the one or more target parameters at phase 608, may be reduced or even avoided, after the transmission of the data frames has begun from the source node to the server.

Figure 7:
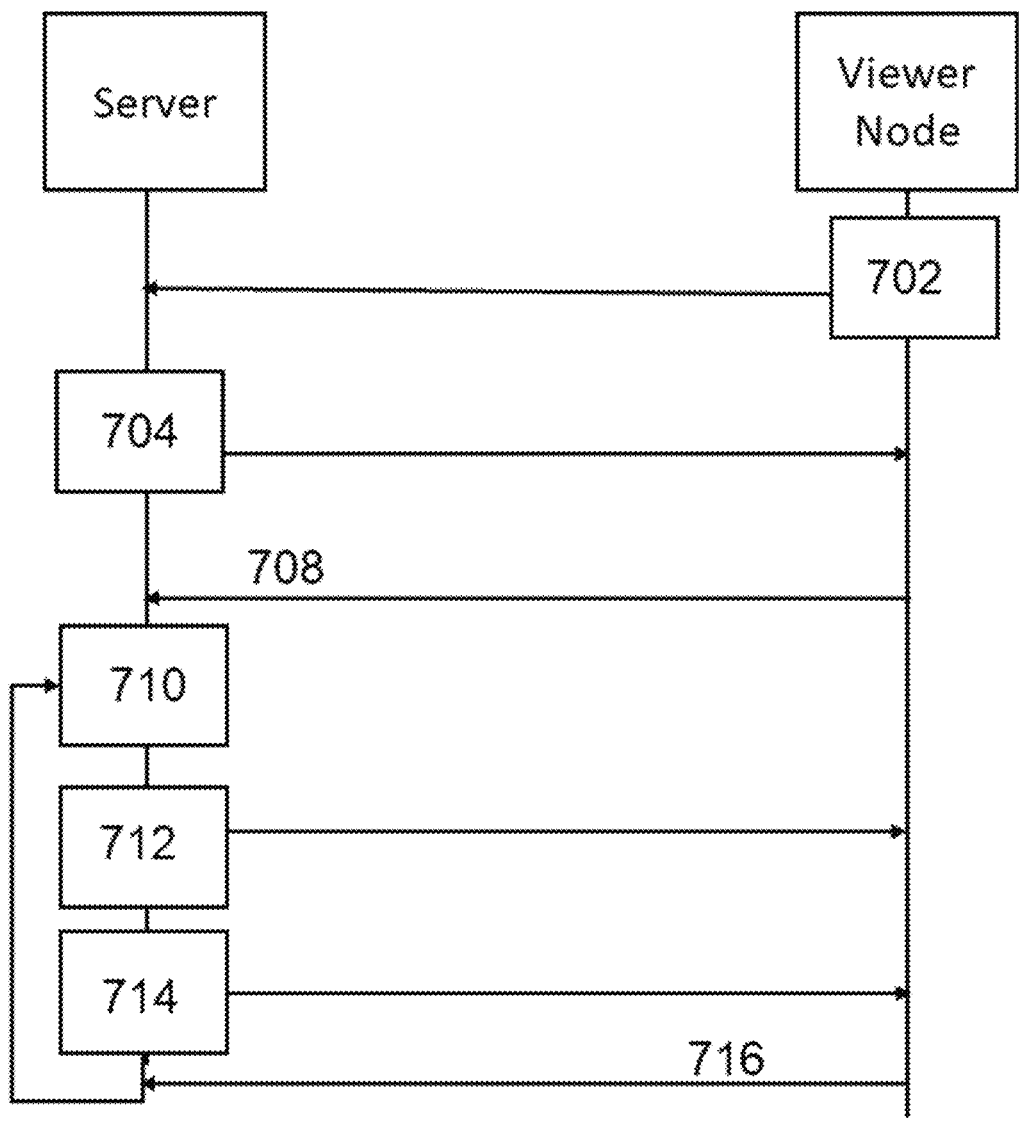
FIG. 7 illustrates a sequence for managing a data flow from a server to viewer nodes in accordance with at least some embodiments.

FIG. 7 illustrates a sequence for managing a data flow from a server to viewer nodes in accordance with at least some embodiments. The sequence is illustrated between the server and one of the viewer nodes. The sequence may be performed in a similar manner between the server and other viewer nodes. It should be noted that in this connection the server is a source node of the host-to-host protocol connection and the viewer nodes are recipient nodes of the host-to-host protocol connection.

Phase 702 comprises the server receiving from one of the viewer nodes, information indicating one or more target parameters. The one or more target parameters may be received included to a request for data frames. Examples of the target parameters are described with phase 602 and comprise at least a target frame rate, size, quality and compression format of the data frames.

Phase 704 comprises adjusting, at the server, one or more target parameters for data frames transmitted to the viewer node on the basis of the received information and transmitting, by the server, data frames to the viewer node on the basis of the adjusted one or more parameters.

Phase 708 comprises receiving, at the data source, from the viewer node, feedback information for the transmitted data frames.

Phase 710 comprises determining, at the server, a connection quality of the transmitted data frames on the basis of the received feedback information. In an example the connection quality may be a success rate of real-time delivery of data frames to the viewer node.

Phases 712 and 714 comprise determining, at the server, whether the connection quality meets a threshold.

Phase 712 comprises, if the connection quality has met the threshold, transmitting data frames to the viewer node without adjusting the one or more parameters.

Phase 714 comprises, if the connection quality has not met the threshold, adjusting the one or more parameters and transmitting data frames to the viewer node on the basis of the adjusted one or more parameters.

Phase 716 comprises receiving, at the server, from the viewer node, feedback information for the transmitted data frames in phase 712 or 714. Then, the sequence may proceed to phase 710 for determining the connection quality anew on the basis of the feedback information received at phase 716. The connection quality may be determined on the basis of a selected feedback information. Accordingly, the feedback information for determining the connection quality may at least comprise the feedback information received for frames that have been transmitted after adjusting the one or more parameters the last time.

In an example in accordance with at least some embodiments, a method for managing data flows between a source node and a plurality of recipient nodes, comprises performing the method in accordance with any of the methods described in connection with FIGS. 2 to 5 for managing data flow between the data source and each of the recipient nodes. In this way data flows to each of the recipient nodes may be managed based on their connection qualities. This is beneficial at least, when data frames are communicated between the source node and the recipient node over heterogenous data links that may be have differences for example capabilities such as capabilities in terms of supported data rates, delay performance and delay variance.

Figures 8, 9:
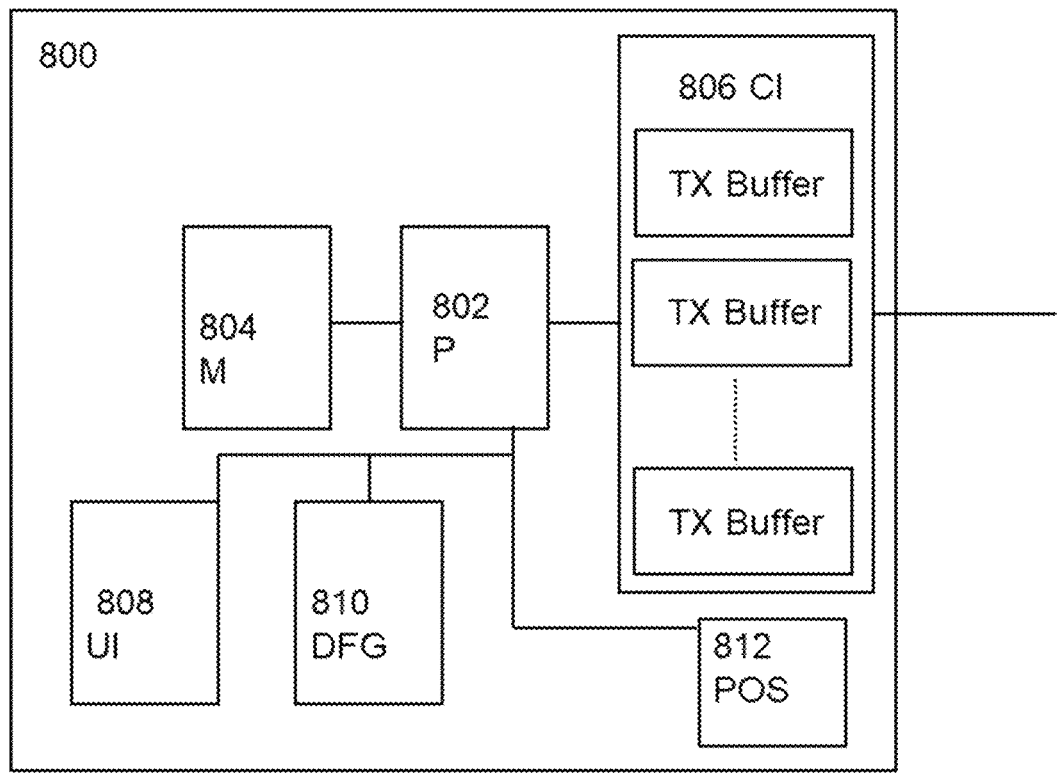
FIG. 8 illustrates an example of an apparatus in accordance with at least some embodiments.
FIG. 9 illustrates a method in accordance with at least some embodiments.

FIG. 8 illustrates an example of an apparatus in accordance with at least some embodiments of the present invention. The apparatus 800 may be a source node or a recipient node.

The apparatus comprises a processor (P) 802 and a communications interface (CI) 806. The processor is operatively connected to the communications interface for controlling the communications interface. The apparatus may comprise a memory (M) 804. The memory may be operatively connected to the processor. It should be appreciated that the memory may be a separate memory or included to the processor and/or the CI. The CI may be a transceiver or connected to a transceiver or at least capable of being connected to a transceiver. The memory may store a computer program computer readable program code means for example computer program code, for execution by the processor. Execution of the computer readable program code means may cause the apparatus performing one or more functionalities described in an embodiment described herein.

Examples of the apparatus 800 comprise a source node, a recipient node, a UE, and a server.

In an example in accordance with at least some embodiments the CI 806 may comprise one or more buffers, e.g. a transmission (TX) buffer. The buffers may be controlled by the processor and/or by the CI to process data frames on the basis of the LIFO method.

In an example in accordance with at least some embodiments the apparatus comprises a Data Frame Generator (DFG) 810, a User Interface (UI) 810 and/or a positioning system (POS) 812. The DFG may be configured to generate data frames. At least one of a frame rate, compression format of the data frames, size of the data frames, quality of the data frames and content of the data frames may be controlled by the processor at least based on target parameters. In an example the, DFG may be configured to generate data frames comprising still images, video and/or positioning data. The DFG may comprise or be connected to a still camera and/or a video camera for obtaining still images and/or video for the data frames. The positioning data may be geographical coordinates, for example global Positioning System (GPS) coordinates. The positioning data may be obtained from the POS. In an example the POS may be a GPS device. The UI may provide output of information to a user and/or input of information to a user. Examples of the information output by the UI comprise data frames that may be displayed to the user. Examples of the input information comprise commands of the user. The UI may comprise a touch screen for both input and output of information. The UI may further comprise an audio output.

According to an embodiment, the processor is configured to control the CI and/or to perform one or more functionalities described according to an embodiment.

An apparatus, for example a server, according to an embodiment may comprise one or more apparatuses 800 for managing data flows between a source node and a plurality of recipient nodes. In this way, a data flow between the server, and each of the recipient nodes may be managed by a dedicated apparatus and connection quality specific to each of the connections may be observed in adjusting data rates over the connections.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

FIG. 9 illustrates a method in accordance with at least some embodiments. The method provides managing a data flow between a source node and a recipient node. The method may be performed by the source node. The method may be performed in connection with at least one of the phases described with FIG. 2 and FIG. 3. The method provides that data frames of a data flow that have not been transmitted to a recipient node in real-time may be delivered to the recipient node for reconstructing the data flow.

Phase 902 comprises determining at least one of an end of data flow and an increased bandwidth to the recipient node.

Phase 904 comprises purging the transmission buffer to the recipient node. It should be noted that the transmission buffer may be purged partially or the whole transmission buffer may be purged. The latter situation may also be referred to flushing the transmission buffer, which may take place, when the end of data flow has been determined. On the other hand purging the transmission buffer partially provides efficient use of the increased bandwidth, and later, when the data flow ends, the less data frames are to be transmitted to the recipient node. Accordingly, purging the transmission buffer should be understood herein as a process of emptying at least partially a transmission queue of data frames in the transmission buffer.

In an example, phase 902 comprises that an increased bandwidth is determined on the basis of receiving feedback information from the recipient node and determining that a time between the reception of the feedback information and a next frame to be stored to the transmission buffer at the target frame rate is higher than a time for transmitting at least one data frame stored to the transmission buffer.

In an example, phase 904 comprises transmitting the data frames from the transmission buffer on the basis of a LIFO method or a First-in-First-out (FIFO) method. The FIFO method may be preferred for facilitating reconstructing the data flow from the beginning of the flow at the recipient node.

Figure 10:
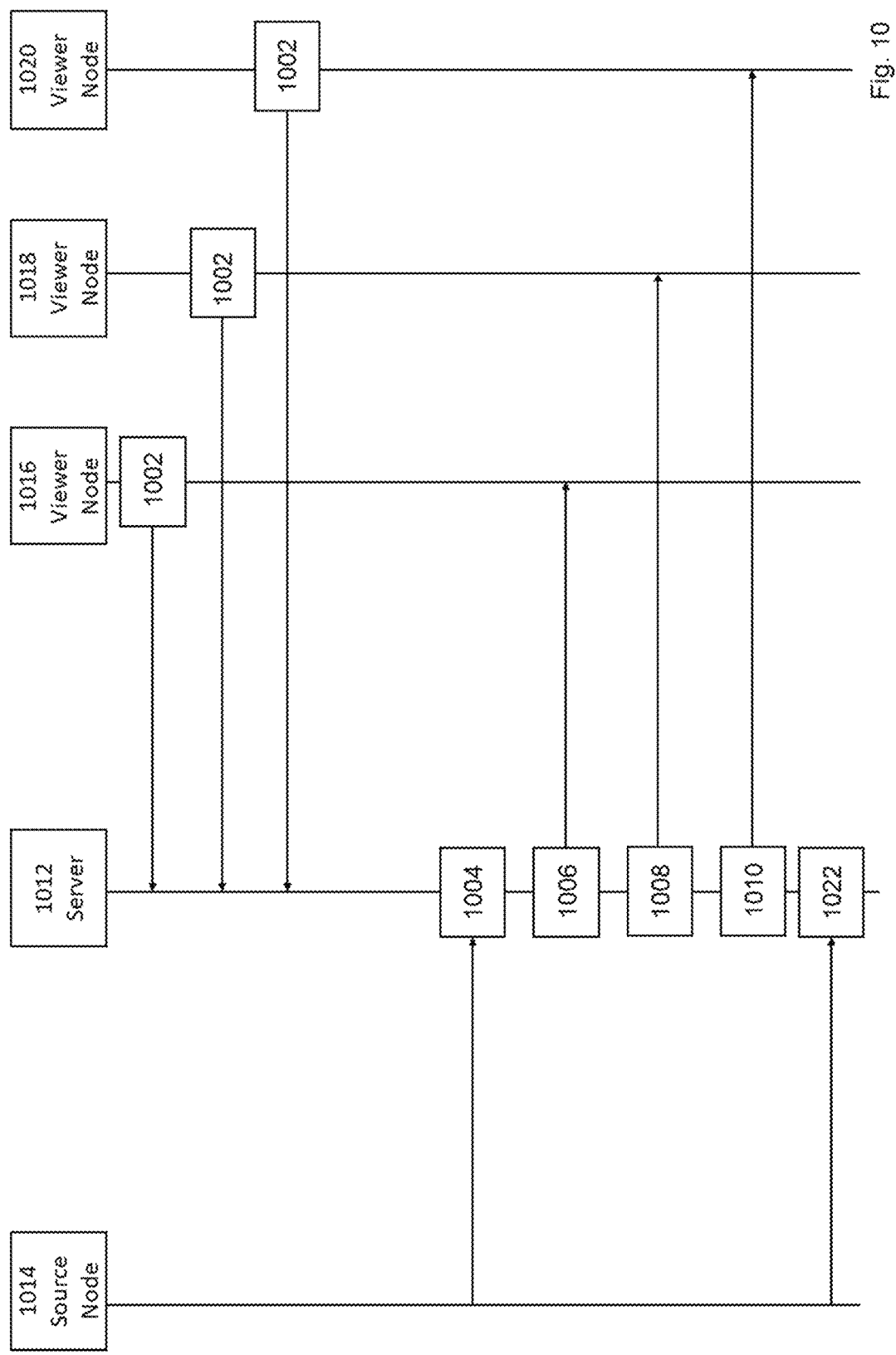
FIG. 10 illustrates managing a data flow from a source node to viewer nodes via a server in accordance with at least some embodiments.

FIG. 10 illustrates managing a data flow from a source node to viewer nodes via a server in accordance with at least some embodiments. A server 1012 may be configured to manage delivery of data frames from one or more source nodes 1014, for example user devices, to one or more viewer nodes 1016, 1018, 1020. A source node 1014 may be connected to the server 1012 over a host-to-host protocol for real-time delivery of data frames from the source node to the server. The server may host buffers, i.e. transmission buffers, for transmitting data frames to each of the viewer nodes and data flows to each of the viewer nodes may be managed in accordance with at least some embodiments described herein, e.g. with phases 202 to 208 in FIG. 2. In this way real-time data delivery to each of the viewer nodes may be supported based on their individual connection qualities.

The viewer nodes 1016, 1018, 1020 may be host-to-host protocol endpoints at the server and/or at user devices. Examples of the viewer nodes at the server comprise at least analytics software applications for machine-based processing the data frames from the source node. Examples of the viewer nodes at the user devices comprise software applications, e.g. audio players, video players, that are operatively connected to one or more user interface devices configured at least for audio and/or video output to user. The software applications may be configured to cause rendering/playing content included to the data frames on the user devices such that the user may consume the content. Since the data frames are delivered in real-time, the viewer nodes have the most recent data frame with a controlled/pre-define quality at their disposal. In this way an up-to-date situational awareness of the viewer nodes and analytics software applications may be supported.

Accordingly, in the scenario illustrated in FIG. 10, data frames may be first delivered from the source node 1014 to the server 1012, whereby the server is a recipient node on the host-to-host protocol connection. The server may deliver the data frames received from the source node to the viewer nodes 1016, 1018, 1020 that have been subscribed for receiving data frames from the source node over a host-to-host protocol. Accordingly, the viewer nodes are recipient nodes and the server node is a source node between the host-to-host protocol connection between the server and the viewer nodes.

Phase 1002 comprises the one or more viewer nodes 1016, 1018, 1020 subscribing to receive data frames from the source node 1014 over a host-to-host protocol connection to the server 1012. Once a viewer node has been subscribed, the server may deliver data frames in real-time to the viewer node provided the server has received any data frames from the source node. It should be noted that communications of data frames between each of the viewer nodes and the server may be arranged in accordance with a method, e.g. the method according to phases 202 to 208 in FIG. 2, described herein for supporting real-time communications of data frames from the server to each of the viewer nodes.

Phase 1004 comprises the server 1012 receiving data frames from the source node. Communications of data frames between the source node and the server may be arranged in accordance with a method, e.g. the method according to phases 202 to 208 in FIG. 2, described herein for supporting real-time communications of data frames from the source node to the server.

Phase 1006, 1008, 1010 comprises the server transmitting data frames to each of the viewer nodes in accordance with a method, e.g. the method according to phases 202 to 208 in FIG. 2, described in at least some embodiments herein for supporting real-time communications of data frames from the server to each of the viewer nodes.

Phase 1022 comprises the server receiving data frames, when the source node 1014 purges its transmission buffer to the server node in accordance with the phases of the method described with FIG. 9.

FIG. 11 illustrates examples of target parameters for viewer nodes. The target parameters for viewer nodes illustrate target parameters for transmission from a source node different types of a recipient nodes, i.e. viewer nodes. Examples of the viewer nodes comprise an audio player software 1102, a video player software 1104 and an analytics software 1106. Each type of the viewer nodes may have respective target parameters 1108, 1119, 1112, 1114 and corresponding ranges. Examples of the target parameters comprise a frame rate 1108, a compression parameter 1110, quality 1112 and compression format 1114. In the illustrated example, the frame rate of the audio player software is defined in milliseconds (ms) within a range from 20 ms to 1000 ms, the quality of the audio player software is defined by sample rate in Hz within a range from 8 kHz to 48 kHz, the compression format is Opus, Advanced Audio Coding (AAC) or MPEG Layer III (MP3). In the illustrated example, the frame rate of the video player software is defined in frames per second (fps) within a range from 1 fps to 30 fps, the quality of the video player software is defined by resolution within a range from 320 p to 4 k, the compression format may be Webp, Jpeg, H264 or H265. It should be noted that 4 k refers to refers to a horizontal display resolution of approximately 4,000 pixels. 320 p refers to 320 horizontal lines of pixels. The compression efficiency parameters for different viewer nodes refers to a quality setting of an encoding algorithm. In the illustrated example, the frame rate of the analytics software has scalable frame rate requirements, the compression parameter is static, the quality of the analytics software is static and the compression format may be any. It should be noted that the frame rate 1108 and quality 1112 may be adjusted in steps within the given ranges for each of the examples of the viewer nodes and the compression format may be selected to be any of the options for compression format for each of the examples of the viewer nodes. It should be noted that FIG. 11 illustrates only some examples and in practice the ranges, options and values of the parameters may be different.

In an example in accordance with at least some examples, adjusting one or more of the target parameters may comprise adjusting the target parameters within a given range of the parameter. The parameters may be adjusted in steps within the given range. The given ranges may be specific to viewer nodes according to the example of FIG. 11. The adjusting may be performed on the basis of a connection quality, for example if the connection quality has not met the threshold. In an example, the compression and a frame rate of data frames transmitted to the recipient node may be adjusted on the basis of a frame quality and size. The frame quality and size may indicate the quality 1112.

In an example, a connection quality may be measured as described with phase 204 in FIG. 2. If the connection quality has not met a threshold, the target parameters may be adjusted in accordance with phase 714. When the connection quality has not met the threshold, the connection quality may be considered insufficient. When the connection quality is insufficient, transmission errors of data frames may be increased, which may prevent successful reception of the data frames and a data rate supported by a connection for transmission of the data frames may be low. Therefore, real-time communications of data frames with sufficient quality from a source to a recipient is challenging or may be prevented. Adjusting the target parameters supports real-time communications of data frames from the source node to the recipient node. In an example, if the connection quality has not met the threshold, e.g. a success rate, one or more of the target parameters may be changed. To facilitate meeting the threshold, the frame rate may be decreased and/or the quality may be decreased. The target parameters may be arranged in have predefined combinations of target parameters values that may be selected, when the target parameters are changed. Examples of the combinations comprise at least combinations of frame rate, quality and compression format.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc, should be understood to express software for a programmable processor firmware such as the programmable content of a hardware device as instructions for a processor or configured or configuration settings for a fixed function device, gate array, programmable logic device, etc.

EXAMPLES

1. A method for managing a data flow between a source node and a recipient node, the method comprising:
   storing, at the source node, data frames into a buffer for transmission to the recipient node over a host-to-host protocol connection;
   measuring, at the source node, a connection quality of the host-to-host protocol connection;
   adjusting, at the source node, one or more target parameters of the transmission on the basis of the measured connection quality;

transmitting, by the source node, data frames from the buffer to the recipient node on the basis of a Last-In, First-Out (LIFO) method and the adjusted one or more target parameters.

2. The method of example 1, comprising:
transmitting, by the source node, data frames from the buffer to the recipient node using one or more target parameters;
receiving, at the source node, from the recipient node, feedback information for the transmitted data frames;
determining, at the source node, the connection quality of the transmitted data frames on the basis of received feedback information;
determining, at the source node, whether the connection quality meets a threshold; and
adjusting, at the source node, the one or more of the target parameters, if the connection quality has not met the threshold.

3. The method of example 1 or 2, comprising:
determining, at the source node, that the connection quality exceeds the one or more of the target parameters;
transmitting, at the source node, to the recipient node at least one data frame stored into the buffer that is older than a previous data frame transmitted from the buffer.

4. The method of any of examples 1 to 3, comprising:
receiving, by the source node, from the recipient node, information indicating a frame quality and size;
adjusting, at the source node, a compression format and a frame rate of data frames transmitted to the recipient node on the basis of the frame quality and size.

5. The method of any of examples 1 to 4, comprising:
determining the connection quality on the basis of a success rate of real-time delivery of data frames from the source node to the recipient node over the host-to-host protocol connection.

6. The method of any of examples 1 to 5, comprising:
determining at least one of an end of data flow and an increased bandwidth to the recipient node;
purging the transmission buffer to the recipient node.

7. A method for managing data flows between a source node and a plurality of recipient nodes, comprising: performing the method in accordance with any of examples 1 to 6 for managing data flows between the data source and each of the recipient nodes.

8. An apparatus comprising:
means for managing a data flow between a source node and a recipient node;
means for storing, at the source node, data frames into a buffer for transmission to the recipient node over a host-to-host protocol connection;
means for measuring, at the source node, a connection quality of the host-to-host protocol connection
means for adjusting, at the source node, one or more target parameters of the transmission on the basis of the measured connection quality
means for transmitting, by the source node, data frames from the buffer to the recipient node on the basis of a Last-In, First-Out (LIFO) method and the adjusted one or more target parameters.

9. The apparatus according to example 8, comprising:
means for transmitting, by the source node, data frames from the buffer to the recipient node using one or more target parameters
means for receiving, at the source node, from the recipient node, feedback information for the transmitted data frames means for determining, at the source node, the connection quality of the transmitted data frames on the basis of received feedback information
means for determining, at the source node, whether the connection quality meets a threshold and
means for adjusting, at the source node, the one or more of the target parameters, if the connection quality has not met the threshold .

10. The apparatus according to example 8 or 9, comprising:
means for determining, at the source node, that the connection quality exceeds the one or more of the target parameters
means for transmitting, at the source node, to the recipient node at least one data frame stored into the buffer that is older than a previous data frame transmitted from the buffer .

11. The apparatus according to any of examples 8 to 10, comprising:
means for receiving, by the source node, from the recipient node, information indicating a frame quality and size
means for adjusting , at the source node, a compression format and a frame rate of data frames transmitted to the recipient node on the basis of the frame quality and size .

12. The apparatus according to any of examples 8 to 11, comprising:
means for determining the connection quality on the basis of a success rate of real-time delivery of data frames over the host-to-host protocol connection.

13. The apparatus according to any of examples 8 to 12, comprising:
means for determining at least one of an end of data flow and an increased bandwidth to the recipient node;
means for purging the transmission buffer to the recipient node.

14. An apparatus comprising:
means for managing data flows between a source node and a plurality of recipient nodes, comprising the apparatus in accordance with any examples 8 to 13 for managing data flows between the data source and each of the recipient nodes.

15. A computer program for managing a data flow between a source node and a recipient node comprising computer readable program code means adapted to perform at least the following, when executed at the source node:
storing, at the source node, data frames into a buffer for transmission to the recipient node over a host-to-host protocol connection;
measuring, at the source node, a connection quality of the host-to-host protocol connection;
adjusting, at the source node, one or more target parameters of the transmission on the basis of the measured connection quality;
transmitting, by the source node, data frames from the buffer to the recipient node on the basis of a Last-In, First-Out (LIFO) method and the adjusted one or more target parameters.

16. The computer program of example 15, comprising computer readable program code means adapted to perform:
transmitting, by the source node, data frames from the buffer to the recipient node using one or more target parameters;
receiving, at the source node, from the recipient node, feedback information for the transmitted data frames;

determining, at the source node, the connection quality of the transmitted data frames on the basis of received feedback information;

determining, at the source node, whether the connection quality meets a threshold; and adjusting, at the source node, the one or more of the target parameters, if the connection quality has not met the threshold.

17. The computer program of example 15 or 16, comprising computer readable program code means adapted to perform determining, at the source node, that the connection quality exceeds the one or more of the target parameters;

transmitting, at the source node, to the recipient node at least one data frame stored into the buffer that is older than a previous data frame transmitted from the buffer.

18. The computer program of any of examples 15 to 17, comprising computer readable program code means adapted to perform:

receiving, by the source node, from the recipient node, information indicating a frame quality and size;

adjusting, at the source node, a compression format and a frame rate of data frames transmitted to the recipient node on the basis of the frame quality and size.

19. The computer program of any of examples 15 to 18, comprising computer readable program code means adapted to perform:

determining the connection quality on the basis of a success rate of real-time delivery of data frames over the host-to-host protocol connection 20. The computer program of any of examples 15 to 19, comprising computer readable program code means adapted to perform:

determining at least one of an end of data flow and an increased bandwidth to the recipient node;

purging the transmission buffer to the recipient node.

21. A computer program comprising computer readable program code means adapted to perform at least the following, when executed at a source node:

managing data flows between the source node and a plurality of recipient nodes, comprising: performing the method in accordance with any of examples 1 to 6 for managing data flows between the data source and each of the recipient nodes.

22. A non-transitory computer readable medium comprising program instructions stored thereon for performing at least the following:

managing a data flow between a source node and a recipient node;

for storing, at the source node, data frames into a buffer for transmission to the recipient node over a host-to-host protocol connection;

measuring, at the source node, a connection quality of the host-to-host protocol connection;

adjusting, at the source node, one or more target parameters of the transmission on the basis of the measured connection quality;

transmitting, by the source node, data frames from the buffer to the recipient node on the basis of a Last-In, First-Out (LIFO) method and the adjusted one or more target parameters.

23. The non-transitory computer readable medium of example 22 comprising program instructions stored thereon for performing:

transmitting, by the source node, data frames from the buffer to the recipient node using one or more target parameters;

receiving, at the source node, from the recipient node, feedback information for the transmitted data frames;

determining, at the source node, the connection quality of the transmitted data frames on the basis of received feedback information;

determining, at the source node, whether the connection quality meets a threshold; and adjusting, at the source node, the one or more of the target parameters, if the connection quality has not met the threshold.

24. The non-transitory computer readable medium of example 22 or 23 comprising program instructions stored thereon for performing determining, at the source node, that the connection quality exceeds the one or more of the target parameters;

transmitting, at the source node, to the recipient node at least one data frame stored into the buffer that is older than a previous data frame transmitted from the buffer .

25. The non-transitory computer readable medium of any of examples 22 to 24 comprising program instructions stored thereon for performing:

receiving, by the source node, from the recipient node, information indicating a frame quality and size;

adjusting , at the source node, a compression format and a frame rate of data frames transmitted to the recipient node on the basis of the frame quality and size .

26. The non-transitory computer readable medium of any of examples 22 to 25 comprising program instructions stored thereon for performing:

determining at least one of an end of data flow and an increased bandwidth to the recipient node;

purging the transmission buffer to the recipient node.

27. A non-transitory computer readable medium comprising program instructions stored thereon for performing at least the following:

managing data flows between a source node and a plurality of recipient nodes, comprising: performing the method in accordance with any of examples 1 to 6 for managing data flows between the data source and each of the recipient nodes.

28. An apparatus for managing a data flow between a source node and a recipient node comprising:

one or more processors, and memory storing instructions that, when executed by the one or more processors, the apparatus is caused to:

store, at the source node, data frames into a buffer for transmission to the recipient node over a host-to-host protocol connection;

measure, at the source node, a connection quality of the host-to-host protocol connection;

adjust, at the source node, one or more target parameters of the transmission on the basis of the measured connection quality;

transmit, by the source node, data frames from the buffer to the recipient node on the basis of a Last-In, First-Out (LIFO) method and the adjusted one or more target parameters.

29. The apparatus according to example 28, wherein the apparatus is caused to:

transmit, by the source node, data frames from the buffer to the recipient node using one or more target parameters;

receive, at the source node, from the recipient node, feedback information for the transmitted data frames;

determine, at the source node, the connection quality of the transmitted data frames on the basis of received feedback information;

determine, at the source node, whether the connection quality meets a threshold; and adjust, at the source node, the one or more of the target parameters, if the connection quality has not met the threshold.

30. The apparatus according to example 28 or 29, wherein the apparatus is caused to:

determine, at the source node, that the connection quality exceeds the one or more of the target parameters;

transmit, at the source node, to the recipient node at least one data frame stored into the buffer that is older than a previous data frame transmitted from the buffer.

31. The apparatus according to any of examples 28 to 30, wherein the apparatus is caused to:

receive, by the source node, from the recipient node, information indicating a frame quality and size;

adjust , at the source node, a compression format and a frame rate of data frames transmitted to the recipient node on the basis of the frame quality and size.

32. The apparatus according to any of examples 28 to 31, wherein the apparatus is caused to:

determine the connection quality on the basis of a success rate of real-time delivery of data frames over the host-to-host protocol connection.

33. The apparatus according to any of examples 28 to 32, wherein the apparatus is caused to:

determine at least one of an end of data flow and an increased bandwidth to the recipient node;

purge the transmission buffer to the recipient node.

34. An apparatus comprising:

one or more processors, and memory storing instructions that, when executed by the one or more processors, the apparatus is caused to: managing data flows between a source node and a plurality of recipient nodes, comprising: performing the method in accordance with any of examples 1 to 6 for managing data flows between the data source and each of the recipient nodes.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method for managing a data flow between a source node and a recipient node, the method comprising:

storing, at the source node, data frames into a buffer for transmission to the recipient node over a host-to-host protocol connection;

measuring, at the source node, a connection quality of the host-to-host protocol connection, wherein the connection quality comprises a success rate of real-time delivery of data frames from the source node to the recipient node over the host-to-host protocol connection, and wherein the host-to-host protocol connection is a transport layer protocol connection;

adjusting, at the source node, one or more target parameters of the transmission on the basis of the measured connection quality, said one or more target parameters comprising at least one of a frame rate, size, quality and compression format for generating data frames to the buffer;

determining, at the source node, that the connection quality exceeds the one or more of the target parameters;

transmitting, by the source node, data frames from the buffer to the recipient node on the basis of a Last-In, First-Out (LIFO) method and the adjusted one or more target parameters; and transmitting, at the source node, to the recipient node at least one data frame stored into the buffer that is older than a previous data frame transmitted from the buffer.

2. The method of claim 1, comprising:

transmitting, by the source node, data frames from the buffer to the recipient node using one or more target parameters;

receiving, at the source node, from the recipient node, feedback information for the transmitted data frames;

determining, at the source node, the connection quality of the transmitted data frames on the basis of received feedback information;

determining, at the source node, whether the connection quality meets a threshold; and adjusting, at the source node, the one or more of the target parameters, if the connection quality has not met the threshold.

3. The method of claim 1, comprising:

receiving, by the source node, from the recipient node, information indicating a frame quality and size;

adjusting, at the source node, a compression format and a frame rate of data frames transmitted to the recipient node on the basis of the frame quality and size.

4. The method of claim 1, comprising:

determining at least one of an end of data flow and an increased bandwidth to the recipient node;

purging the transmission buffer to the recipient node.

5. A method for managing data flows between a source node and a plurality of recipient nodes, comprising: managing data flows between a source node and a plurality of recipient nodes, comprising: performing between the data source and each of the recipient nodes:

storing, at the source node, data frames into a buffer for transmission to the recipient node over a host-to-host protocol connection;

measuring, at the source node, a connection quality of the host-to-host protocol connection, wherein the connection quality comprises a success rate of real-time delivery of data frames from the source node to the recipient node over the host-to-host protocol connection, and wherein the host-to-host protocol connection is a transport layer protocol connection;

adjusting, at the source node, one or more target parameters of the transmission on the basis of the measured connection quality, said one or more target parameters comprising at least one of a frame rate, size, quality and compression format for generating data frames to the buffer;

determining, at the source node, that the connection quality exceeds the one or more of the target parameters;

transmitting, by the source node, data frames from the buffer to the recipient node on the basis of a Last-In, First-Out (LIFO) method and the adjusted one or more target parameters; and transmitting, at the source node, to the recipient node at least one data frame stored into the buffer that is older than a previous data frame transmitted from the buffer.

6. An apparatus for managing a data flow between a source node and a recipient node comprising:

one or more processors, and memory storing instructions that, when executed by the one or more processors, the apparatus is caused to:

store, at the source node, data frames into a buffer for a transmission to the recipient node over a host-to-host protocol connection;

measure, at the source node, a connection quality of the host-to-host protocol connection, wherein the connection quality comprises a success rate of real-time delivery of data frames from the source node to the recipient node over the host-to-host protocol connection, and wherein the host-to-host protocol connection is a transport layer protocol connection;

adjust, at the source node, one or more target parameters of the transmission on the basis of the measured connection quality, said one or more target parameters comprising at least one of a frame rate, size, quality and compression format for generating data frames to the buffer;

determine, at the source node, that the connection quality exceeds the one or more of the target parameters;

transmit, by the source node, data frames from the buffer to the recipient node on the basis of a Last-In, First-Out (LIFO) method and the adjusted one or more target parameters; and transmit, at the source node, to the recipient node at least one data frame stored into the buffer that is older than a previous data frame transmitted from the buffer.

7. The apparatus according to claim 6, wherein the apparatus is caused to:

transmit, by the source node, data frames from the buffer to the recipient node using the one or more target parameters;

receive, at the source node, from the recipient node, feedback information for the transmitted data frames;

determine, at the source node, the connection quality of the transmitted data frames on the basis of received feedback information;

determine, at the source node, whether the connection quality meets a threshold; and adjust, at the source node, the one or more of the target parameters, if the connection quality has not met the threshold.

8. The apparatus according to claim 6, wherein the apparatus is caused to:

receive, by the source node, from the recipient node, information indicating a frame quality and size;

adjust, at the source node, a compression format and a frame rate of data frames transmitted to the recipient node on the basis of the frame quality and size.

9. The apparatus according to claim 6, wherein the apparatus is caused to:

determine at least one of an end of data flow and an increased bandwidth to the recipient node;

purge the transmission buffer to the recipient node.

10. An apparatus comprising:

one or more processors, and memory storing instructions that, when executed by the one or more processors, the apparatus is caused to:

manage data flows between a source node and a plurality of recipient nodes, comprising:

performing between the data source and each of the recipient nodes:

storing, at the source node, data frames into a buffer for transmission to the recipient node over a host-to-host protocol connection;

measuring, at the source node, a connection quality of the host-to-host protocol connection, wherein the connection quality comprises a success rate of real-time delivery of data frames from the source node to the recipient node over the host-to-host protocol connection, and wherein the host-to-host protocol connection is a transport layer connection;

adjusting, at the source node, one or more target parameters of the transmission on the basis of the measured connection quality, said one or more target parameters comprising at least one of a frame rate, size, quality and compression format for generating data frames to the buffer;

determining, at the source node, that the connection quality exceeds the one or more of the target parameters;

transmitting, by the source node, data frames from the buffer to the recipient node on the basis of a Last-In, First-Out (LIFO) method and the adjusted one or more target parameters; and transmitting, at the source node, to the recipient node at least one data frame stored into the buffer that is older than a previous data frame transmitted from the buffer.

11. A computer program product embodied on a non-transitory computer readable medium, said computer-readable medium comprising code for executing a method for managing a data flow between a source node and a recipient node, the method comprising:

storing, at the source node, data frames into a buffer for transmission to the recipient node over a host-to-host protocol connection;

measuring, at the source node, a connection quality of the host-to-host protocol connection, wherein the connection quality comprises a success rate of real-time delivery of data frames from the source node to the recipient node over the host-to-host protocol connection, and wherein the host-to-host protocol connection is a transport layer connection;

adjusting, at the source node, one or more target parameters of the transmission on the basis of the measured connection quality, said one or more target parameters comprising at least one of a frame rate, size, quality and compression format for generating data frames to the buffer;

determining, at the source node, that the connection quality exceeds the one or more of the target parameters;

transmitting, by the source node, data frames from the buffer to the recipient node on the basis of a Last-In, First-Out (LIFO) method and the adjusted one or more target parameters; and transmitting, at the source node, to the recipient node at least one data frame stored into the buffer that is older than a previous data frame transmitted from the buffer.

* * * * *